United States Patent [19]

Hiiragizawa

[11] Patent Number: 5,963,075
[45] Date of Patent: Oct. 5, 1999

[54] LARGE SCALE INTEGRATED CIRCUIT HAVING FUNCTIONAL BLOCKS CONTROLLED WITH CLOCK SIGNALS THAT CONDUCT SETTING OPERATIONS AT DIFFERENT TIMES

[75] Inventor: Yasunori Hiiragizawa, Tokyo, Japan

[73] Assignee: NEC Corporation, Tokyo, Japan

[21] Appl. No.: 08/914,091

[22] Filed: Aug. 19, 1997

[30] Foreign Application Priority Data

Aug. 19, 1996 [JP] Japan .................................. 8-217304

[51] Int. Cl.$^6$ ........................................................ H03K 1/04
[52] U.S. Cl. ........................ 327/295; 327/293; 327/297
[58] Field of Search .................................. 327/293, 295, 327/297, 565, 564, 296

[56] References Cited

U.S. PATENT DOCUMENTS

| | | | |
|---|---|---|---|
| 4,745,573 | 5/1988 | Lebel | 327/297 |
| 5,164,619 | 11/1992 | Luebs | 327/297 |
| 5,394,443 | 2/1995 | Byers et al. | 327/295 |
| 5,774,001 | 6/1998 | Mozdzen et al. | 327/295 |

FOREIGN PATENT DOCUMENTS

63-104443  5/1988  Japan .

*Primary Examiner*—Tim Callahan
*Assistant Examiner*—Jung Ho Kim
*Attorney, Agent, or Firm*—Foley & Lardner

[57] ABSTRACT

An LSIC includes a clock distributor circuit capable of decreasing the power consumption and suppressing the deviation of the power source potential and the transient current. The circuit includes a plurality of functional blocks including CPU. The CPU conducts a data accessing operation via address and data buses to peripheral blocks. There is also provided a clock supply unit to supply clock signals in which at least one of the clock signals has a phase different from those of the remaining clock signals and the clock signals do not accomplish the setting operation at the same time.

18 Claims, 6 Drawing Sheets

LARGE SCALE INTEGRATED CIRCUIT HAVING FUNCTIONAL BLOCKS CONTROLLED WITH CLOCK SIGNALS THAT CONDUCT SETTING OPERATIONS AT DIFFERENT TIMES

BACKGROUND OF THE INVENTION

The present invention relates to large scale integrated circuits (LSICs) such as a microprocessor, a logical LSIC, etc., and in particular, to a clock distribution method in an integrated circuit operating under control of clock pulse signals.

DESCRIPTION OF THE PRIOR ART

With recent advance of technologies, the processing speed as well as the degree of integration of integrated circuits including microprocessors are being rapidly increased. Since the number of operating clock signals or pulses becomes greater as a result, the power consumed in the integrated circuit is increased, which leads to a problem of wrong operations due to a self-heating phenomenon and noises. Furthermore, since there is an increasing desire of an integrated circuit for a portable apparatus using batteries as its power source, it is essential to minimize the power consumption of the integrated circuit in the design thereof.

Figure 1:
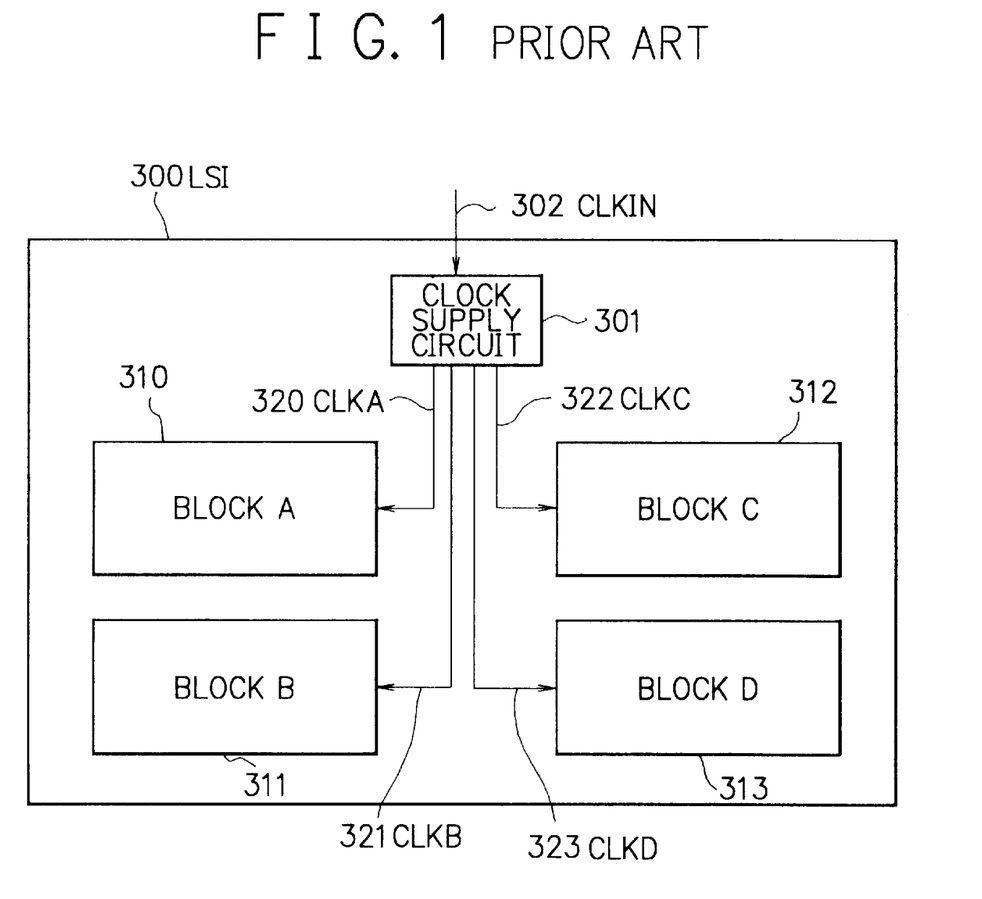
FIG. 1 is a schematic diagram showing an LSIC including a clock signal supply circuit of the prior art.
Figure 2:
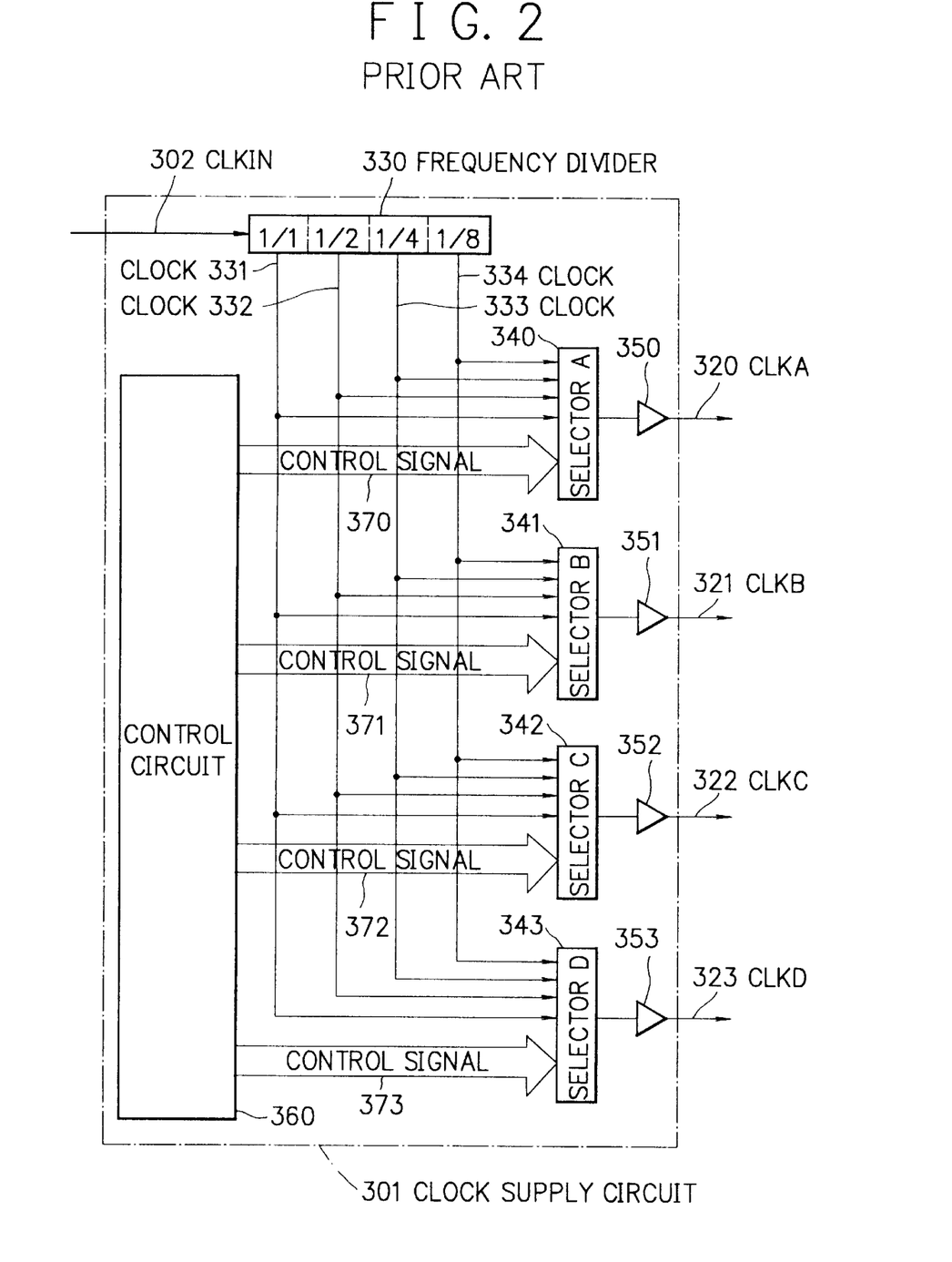
FIG. 2 is a block diagram showing in detail the clock supply circuit of the prior art.

A technology to cope with these problems has been described in the Japanese Patent Laid-Open Publication Ser. No. 63-104443. FIG. 1 shows a schematic block diagram of a large scale integrated circuit (LSIC) including a clock signal supply circuit described in the article above. FIG. 2 is a block diagram showing in detail the clock signal supply circuit. The large scale integrated circuit 300 and the clock supply circuit 301 includes such constituent components as a clock input signal CLKIN 302, a block A 310, a block B 311, a block C 312, a block D 313, a clock signal A (CLKA) 320, a clock signal B (CLKB) 321, a clock signal C (CLKC) 322, a clock signal D (CLKD) 323, a frequency divider circuit 330, clock signals 331 to 334, a selector A 340, a selector B 341, a selector C 342, a selector D 343, buffer circuits 350 to 353, a control circuit 360, and control signals 370 to 373.

The LSIC 300 of FIG. 1 includes a clock supply circuit 301 and functional blocks A 310, B 311, C 312, and D 313. The circuit 301 receives the CLKIN signal 302 as an input signal thereto to produce clock signals including CLKA 320, CLKB 321, CLKC 322, and CLKD 323, which are connected to the blocks A 310 B 311, C 312, and D 313, respectively.

The clock supply circuit 301 of FIG. 2 includes a frequency divider circuit 330, selector circuits 340 to 343, and buffer circuits 350 to 353. The divider 330 is connected to the CLKIN signal 302 as an input thereto and generates clock signals 331 to 334 by dividing the frequency of the CLKIN signal 302. The obtained signals 331 to 334 are linked to the selectors 340 to 343. The controller 360 delivers the control signals 370 to 373 respectively to the selectors 340 to 343 respectively associated therewith. The selectors 340 to 343 feed the respective output signals to the buffers 350 to 353. Outputs from the buffers 350 to 353 are respectively coupled with the signals CLKA 320, CLKB 321, CLKC 322, and CLKD 323, respectively.

Additionally, the controller 360 receives data and address buses and control signals from the CPU and the like, not specifically shown, to conduct selection and control operations for the selectors 340 to 343 and the divided clock pulses 331 to 334.

Operation of the circuit will be now described. The functional blocks 310 to 313 of the LSIC 300 are respectively supplied with the mutually independent clock pulses 320 to 323 from the clock supply circuit 301. Assume that when the CLKIN signal 302 has a frequency of f MHz, the functional blocks operate such that a signal of f MHz is fed to block A, a signal of f/4 MHz is delivered to block B, no signal is supplied to block C, and a signal of f/8 MHz is sent to block D. In this situation, when the controller 360 is initialized in accordance with a predetermined procedure to set the control signals 370 to 373 to preset values, the selectors 340 to 343 respectively output the predetermined clock signals respectively via the buffers 350 to 353 to the CLKA 320 to CLKD 323. With this provision, the power consumed in the circuit is lowered when compared with a case in which the signals supplied to the functional blocks 310 to 313 are substantially equal to each other. Assume that the functional blocks 310 have the same load capacity. The ratio of the power consumption P of the circuit when the the respective blocks receive the same clock signal (same clock signal) to that of the circuit when the blocks receive the clock signals respectively having different frequencies (individual clock signal) is represented as follows.

$$P(\text{same clock signal}):P(\text{individual clock signal}) \quad (1)$$
$$= 4:(1 + 1/4 + 0 + 1/8)$$
$$= 4:11/8$$
$$= 32:11$$

where, the average power consumption is expressed as frequency·load capacitance·voltage.

That is, thanks to the different clock signals, the power consumption can be lowered to about one third. This also indicates that the overall allowed power consumption can be arbitrarily distributed to the respective functional blocks. Assume that the power consumption in the case in which the same clock signals are supplied to the blocks is the maximum power consumption. When the clock frequencies are respectively determined for the respective functional blocks as above, the frequency f (MHz) of CLKIN 302 can be increased to about three times that of the associated original value. For example, if the performance of block A 310 is directly related to the frequency as in a central processing unit (CPU), the resultant performance can be multiplied by three with the same power consumption.

Figure 3:
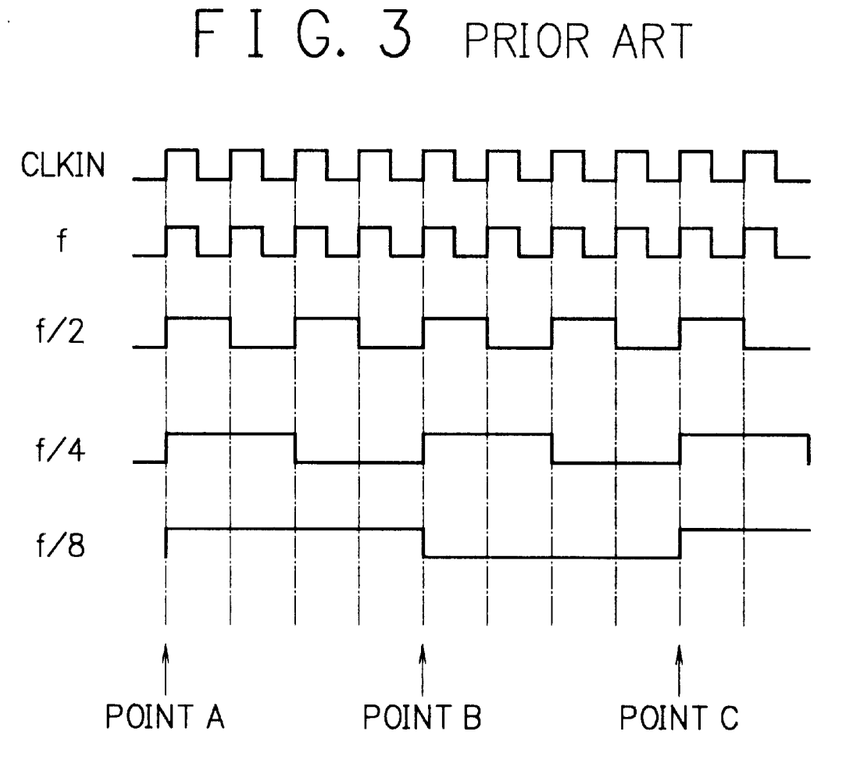
FIG. 3 is a signal timing chart of clock signals produced from a frequency divider of the prior art.

The clock distribution method above is effective means to increase the total performance of the LSIC 300 through the management of the average or mean power consumption of the entire LSIC 300. However, in conjunction with this conventional example, description has not been given of a problem caused by a change in current for each clock cycle. FIG. 3 is a signal timing chart of clock signals produced from the frequency divider 300. When the signals shown in FIG. 3 are supplied to the respective blocks of the circuit, these clock signals are simultaneously changed at points A, B, and C. Assuming that arbitrary clock signals are fed to the blocks 310 to 313, the transient current in the switching operation is the same as that appearing when the CLKIN signal 302 is delivered to the blocks regardless of the clock frequencies supplied from the frequency divider 330. Namely, the transient current depends on the overall size of the LSIC 300.

Figure 4:
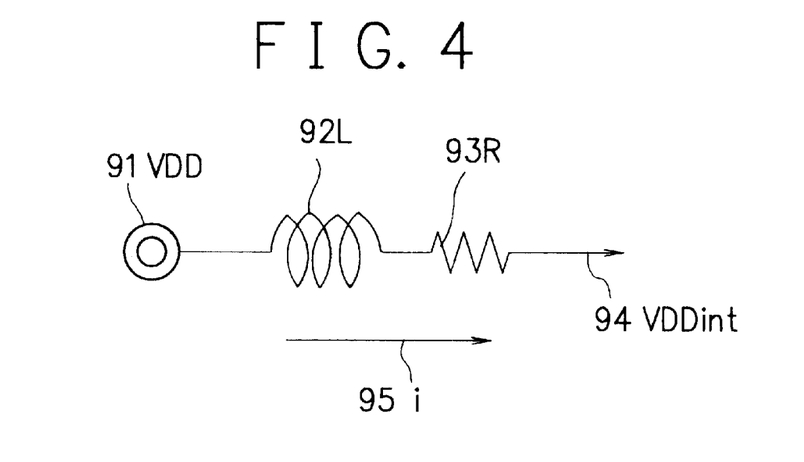
FIG. 4 is a circuit diagram showing a model of a VDD line of a general LSI chip.

FIG. 4 is a circuit diagram showing a model of a VDD line provided in a general LSI chip. This circuit includes a drain power source (VDD) 91, inductance (L) 92, resistance (R)

93, a drain power source input (VDDint) 94, and a current (i) 95. In such a general LSI chip, a large portion thereof is sealed in a package such that the chip is connected to the lead terminals of the package via bonding wires. In the LSI circuit, the drain power source VDD is supplied via metal wirings to respective transistors. In consequence, the VDD line is primarily associated with an inductance component L due to wire bondings and a resistance component R resultant from the wirings. Therefore, assuming that the transient current of VDD is i(t), the VDD on the terminal and the internal VDD of LSIC 300, i.e., VDDint are expressed as follows.

$$VDDint = VDD - [L \cdot di(t)/dt + i(t) \cdot R] \quad (2)$$

This also applies to the GND side of the circuit. Namely, assuming that the transient current on the GND side is j(t), the internal GND potential, i.e., GNDint is represented as follows.

$$GNDint = [L(|dj(t)/dt| + |j(t)|R] \quad (3)$$

Expressions (2) and (3) indicate that the greater the transient current is or the greater the change in the transient current per unitary time is, the larger the potential deviation of VDD and GND is.

In accordance with the method described in the Japanese Patent Laid-Open Ser. No. 63-104443, although the mean value of power consumption can be decreased as indicated by expression (1), the variation in the potential of power source designated by expression (2) or (3) has not been fundamentally removed.

In the conventional example described above, the average or mean power consumption of the overall LSI chip can be controlled by distributing clock signals having mutually different frequencies to the respective functional blocks. However, considerations have not been particularly given to the fluctuation of the power source potential in the transient state and to the transient current, which consequently leads to drawbacks as follows. Although the average power consumption is reduced, there occurs a wrong operation due to variation in the power source potential or the circuit size is limited due to influence of the radiation noise from the power source line in association with the transient current. The operating voltage of power source has tended to decrease because of the finer machining technology of circuits thanks to the recent development of process technologies and requirements in the market. In consequence, when it is assumed that the variation in the power source potential is kept unchanged, the ratio of the variation to the operating power source potential becomes larger. This resultantly causes the wrong operation and hence restricts the circuit size.

SUMMARY OF THE INVENTION

It is therefore an object of the present invention to provide a large scale integrated circuit including a clock distributor circuit which lowers the current consumption and which suppresses the variation in the power source potential and the transient current.

In accordance with the present invention, there is provided a large scale integrated circuit (LSIC) including a plurality of functional blocks coupled with each other via an address bus, a data bus, and a plurality of control signals, at least one of the functional blocks being a control block for generating and outputting the control signals therefrom. The control block includes means for conducting a data accessing operation to the other one of the functional blocks via the address and data buses. The LSIC further includes clock supply means for supplying the respectively functional blocks with a plurality of kinds of clock signals respectively corresponding to functions respectively of the functional blocks. The clock supply means includes a clock distributor circuit for distributing clock signals in which at least one of the clock signals has a phase different from those of the remaining clock signals and the clock signals do not conduct a setting operation at the same time.

Additionally, the clock supply means desirably includes a clock distributor circuit for distributing clock signals in which at least one of the clock signals has a clock cycle different from those of the remaining clock signals, at least one of the clock signals has a phase different from those of the remaining clock signals, and the clock signals do not conduct a setting operation at the same time.

Moreover, the clock distributor circuit of the clock supply means includes two buffer circuits, two logical product circuits including a first logical product circuit and a second logical product circuit, and one flip-flop circuit. The flip-flop circuit includes a clock input terminal linked with a clock input signal. The flip-flop circuit includes a data output terminal connected to one of the input terminals of the first logical product circuit. The flip-flop circuit includes an inverted data output terminal coupled with one of the input terminals of the second logical product circuit and a data input terminal of the flip-flop circuit. Each of the first and second logical product circuits includes other input terminal connected to the clock input signal. The clock input signal and output terminals respectively of the first and second logical product circuits are coupled via the buffer circuits to a predetermined functional block of the LSIC.

The LSIC of the present invention includes independent clock supply means for supplying a plurality of kinds of clock signals corresponding to respective functions of the functional blocks. The clock supply means includes a clock distributor circuit distributing a plurality of output clock signals in which at least one output clock signal selected from the plural clock signals produced therefrom has a phase different from those of the remaining clock signals, and it is inhibited that all clock signals conduct the setting operation at the same time. As a result, the maximum transient current appearing in relation to the simultaneous setting operation of the clock signals is reduced.

Moreover, the clock supply means includes a clock distributor circuit distributing a plurality of output clock signals in which at least one output clock signal selected from the plural clock signals produced therefrom has a clock cycle or period different from those of the remaining clock signals and at least one output clock signal selected from the plural clock signals produced therefrom has a phase different from those of the remaining clock signals, and it is inhibited that all clock signals conduct the setting operation at the same time. Resultantly, the power consumption related to the setting operation can be minimized.

The clock distributor circuit can be easily configured by combining two buffers, two logical product circuits, and one flip-flop circuit with each other.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 5:
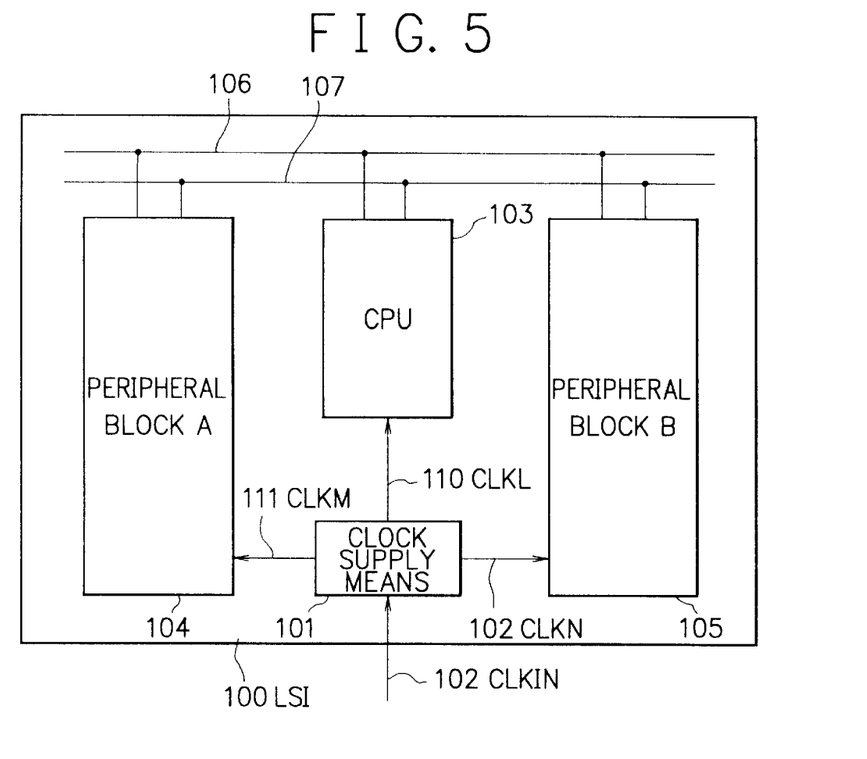
FIG. 5 is a block diagram showing the configuration of an LSIC including an embodiment of the clock supply means in accordance with the present invention.
Figure 6:
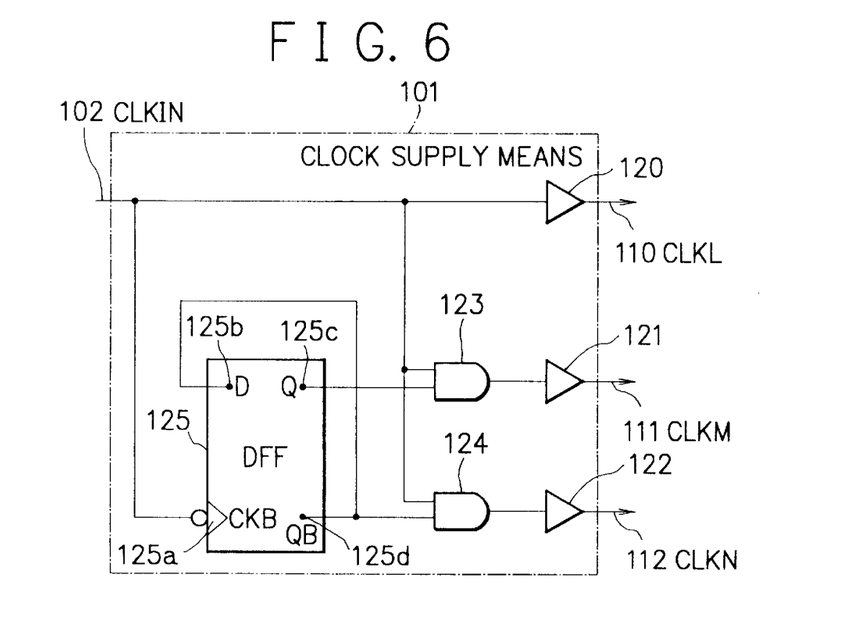
FIG. 6 is a circuit diagram showing an example of the clock supply means of FIG. 5.
Figure 7:
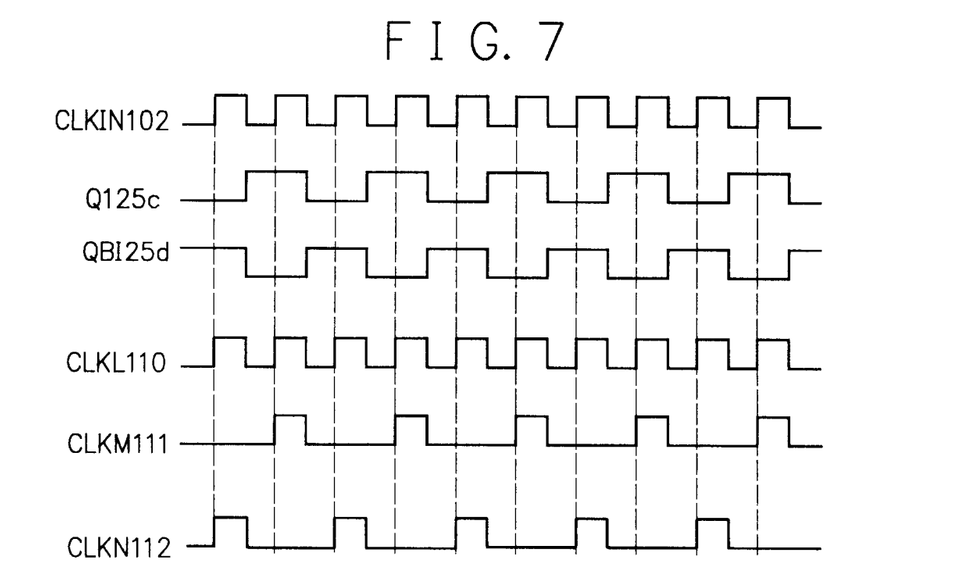
FIG. 7 is a timing chart of clock signals generated from the clock supply means of FIG. 6.

FIG. 5 shows in a block diagram the configuration of an LSIC including an embodiment of clock signal supply means in accordance with the present invention. FIG. 6 is a circuit diagram showing an example of the clock supply means of FIG. 5, whereas FIG. 7 is a timing chart of clock signals supplied from the clock supply means of FIG. 6. The circuit configuration of FIG. 5 includes a large scale integrated circuit (LSIC) 100, clock supply means 101, a clock input signal (CLKIN) 102, a CPU 103, a peripheral block A 104, a peripheral block B 105, an address/data bus 106, an interface control signal 107, a clock output signal L (CLKL) 110, a clock output signal M (CLKM) 111, a clock output signal N (CLKN) 112, buffer circuits 120 to 122, logical product (AND) circuits 123 and 124, a flip-flop (DFF) circuit 125, a clock input (CKB) terminal 125a, a data input (D) terminal 125b, a data output (Q) terminal 125c, and an inverted data output (QB) terminal 125d.

The LSIC 100 includes the clock supply means 101, the CPU 103, and functional blocks, namely, a peripheral block A 104 and a peripheral block B 105. The clock supply means 101 is connected to the CLKIN 102, CLKL 110, CLKM 111, and CLKN 112. The CPU 103 is linked with the CLKL 110 and the peripheral blocks A 104 and B 105 are respectively coupled with the ClKM 111 and the CLKN 112. Moreover, the CPU 103 and the peripheral blocks 104 and 105 are connected to each other via the address/data bus 106 and the interface control signal 107.

The clock supply means 101 includes the buffer circuits 120 to 122, the AND circuits 123 and 124, and the flip-flop (DFF) circuit 125. The DFF circuit 125 includes the clock input (CKB) terminal 125a, the data input (D) terminal 125b, the data output (Q) terminal 125c, and the inverted data output (QB) terminal 125d. The CKB terminal 125a is linked with the clock input (CLKIN) signal 102, whereas the D terminal 125b is coupled with an output signal from the QB terminal 125d. Additionally, while the Q terminal 125c outputs a signal fed to one of the input terminals of the AND circuit 123, the QB terminal 125d delivers a signal to be inputted to one of the input terminals of the AND circuit 124. The remaining input terminals of the AND circuits 123 and 124 are connected to the CLKIN signal 102. The buffers 120 to 122 respectively receive as input signals thereto the CLKIN signal 102, an output signal from the AND circuit 123, and an output from the AND circuit 124. The buffers 120 to 122 respectively include output terminals connected to the CLKL, CLKM, and CLKN signals 111 to 112, respectively.

FIG. 7 shows an operation timing chart of the clock supply means including a combination of the flip-flop circuit and the AND circuits. As can be seen from FIG. 7, the CLKM signal 111 and the CLKN 112 have mutually different phases of pulses and only two kinds of clock signals selected from the three kinds of clock signals CLKL 110, CLKM 111, and CLKN 112 are related to timing of simultaneous change. This makes it possible to suppress the transient current which influences the width of deviation in the power source potential as well as the increase in the radiation noise from the power source line. Assuming that the CPU 103, the peripheral block A 104, and the peripheral block B 105 have the same load capacitance, the maximum transient current can be decreased to about ⅔ that appearing when the clock signals supplied to these blocks are changed at the same time. Conversely, assuming that there is allowed a voltage deviation width equivalent to the conventional case in which the clocks are simultaneously varied, the circuit size can be increased to about 1.5 that of the conventional circuit.

As shown in the timing chart of FIG. 7, the pulse waveform of clock signal CLKL 110 is substantially equal to that of CLKIN 102. Moreover, while the pulse width of CLKM 111 is the same as that of CLKIN 102, the pulse cycle of CLKM 111 is twice that of CLKIN 102. The signals CLKN 112 and CLKM Ill have the same pulse waveform with a phase difference of ½ cycle therebetween. Consequently, in a block supplied with CLKM 111 and CLKN 112, the number of setting operations as well as the power consumption are reduced to those of the operation with clock signals having the pulse waveform of CLKIN 102. Appropriately combining the circuit configurations with each other, the pulse cycle may be doubled. Moreover, if the characteristic of the clock pulses conforms to the contents of the pertinent functional block, it is possible to decrease the power consumption by much more.

In this manner, the transient current can be suppressed by altering the phase between the clock pulses. As described above, when the clock pulses having mutually different pulse cycles are simultaneously fed to the respective blocks, the mean power consumption and the cost performance of the LSI chip are improved when compared with the case in which the respective blocks are supplied with uniform clock pulses as described in relation to the prior art example. However, there arises a problem of means for establishing or implementing an interface between the respective blocks.

Figure 8:
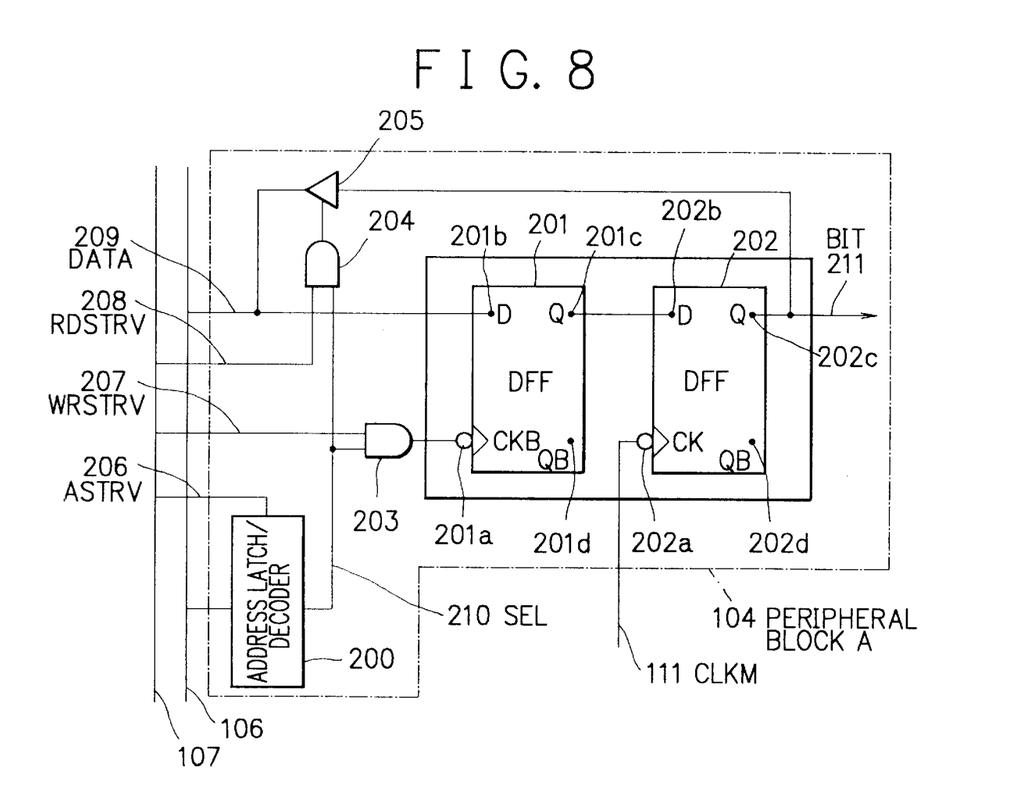
FIG. 8 is a block diagram showing the configuration of an interface circuit for establishing interface between a peripheral block and a central processing unit (CPU)

Description will next be given of the interface between the blocks in the embodiment. FIG. 8 shows in a block diagram the configuration of an interface circuit of the peripheral block A 104 to provide an interface with respect to the CPU 103. The configuration includes the peripheral block A 104, the address/data bus 106, the interface control signal 107, the CLKM signal 111, an address latch/decoder 200, flip-flop (DFF) circuits 201 and 202, a clock input (CKB) terminal 201a, a CK terminal 202a, data input (D) terminals 201b and 202b, data output (Q) terminals 201c and 202c, inverted data output (QB) terminals 201d and 202d, logical product (AND) terminals 203 and 204, a three-state buffer circuit 205, an address control (ASTRV) signal 206, a write control (WRSTRV) signal 207, a read control (RDSTRV) signal 208, a bit line data (DATA) signal 209, an address decode (SEL) signal 210, and a control bit data output (BIT) signal 211.

The interface circuit of FIG. 8 includes the address latch/decoder 200, the DFF circuits 201 and 202, the AND circuits 203 and 204, and the three-state buffer 205. The address latch/decoder 200 is linked with the address/data bus 106 and the ASTRV signal 206. This circuit 200 latches therein a value of the address/data bus 106 at timing of the falling edge of the ASTRV signal 206, decodes the value, and then produces an address decode (SEL) signal 210 as a result of the decoding operation. The SEL signal 210 is coupled with one of the inputs of the AND circuit 203. Linked with the remaining input of the AND circuit 203 is the WRSTRV signal 207 which belongs to the interface control signal 107 and which controls the write operation. Similarly, the SEL signal 210 is connected to one of the inputs of the AND circuit 204, whereas the RDSTRV signal 208 belonging to the interface control signal 107 and supervising the read operation is linked with the remaining input of the AND circuit 204. While the AND circuit 203 produces an output to be fed to the CKB terminal of the DFF circuit 201, the data signal 209 on a predetermined bit line of the address/data bus 106 is connected to the D terminal of the DFF circuit 201. The CLKM signal 111 is coupled with the CK terminal 202a of the DFF circuit 202, whereas the output from the Q terminal 201 of the DFF circuit 201 is linked with the D terminal of the DFF circuit 201. The Q terminal 202c of the DFF circuit 202 delivers a control signal, i.e., BIT 211 for the peripheral block A 104 and is connected to an input port of the three-state buffer 205. The buffer 205 creates an output signal to be linked with a predetermined bit line data (DATA) signal 209 of the address/data bus 106.

Figure 9A:
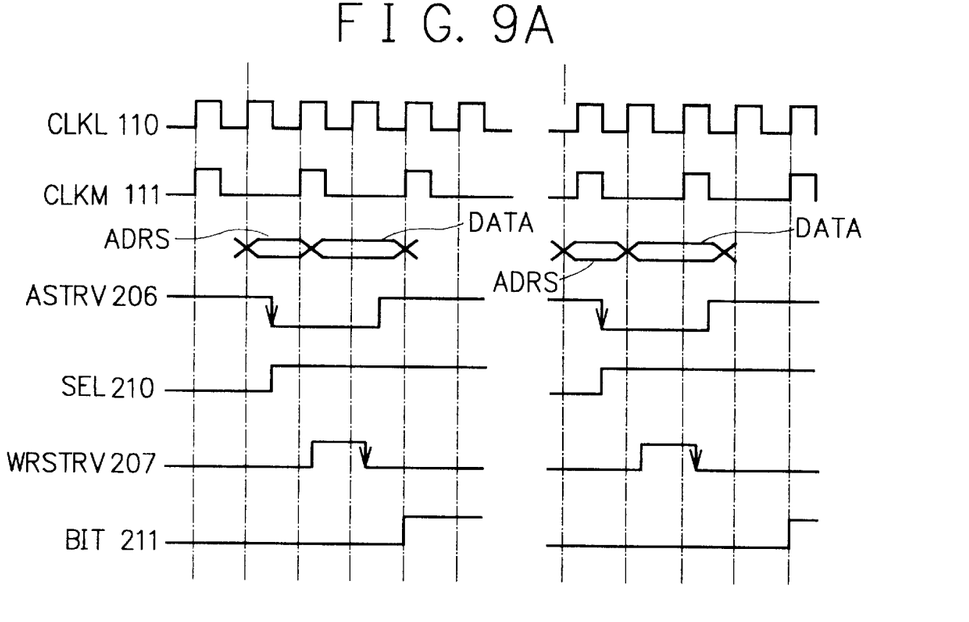
FIG. 9A is a timing chart of the interface of the peripheral block in a write operation.
Figure 9B:
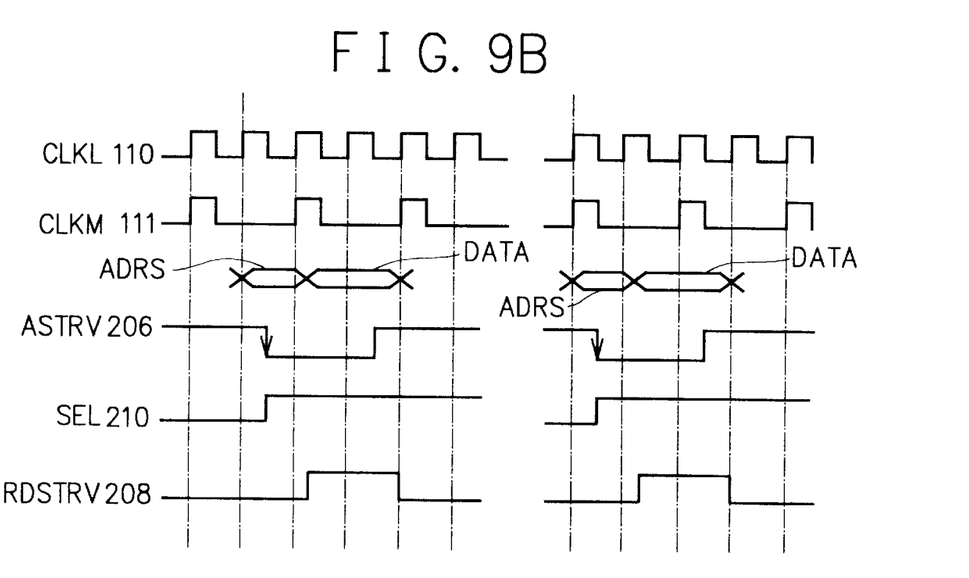
FIG. 9B is a timing chart of the interface of the peripheral block in a read operation.

FIGS. 9A and 9B are signal timing charts showing operation of the interface for the peripheral block of FIG. 5. Specifically, FIGS. 9A and 9B are related to the write and read operations, respectively. Shown in these charts are accesses at different points of timing with respect to the CKLM signal 111 in the write and read operations. As can be seen from these timing charts, the interface is appropriately established for the peripheral block.

In this circuit example, a method of establishing fundamentally an asynchronous interface between the blocks is applied to the interface between the CPU and the peripheral block. However, variations of the interface circuit of this type can be easily thought of by those skilled in the art.

In the LSIC of the present invention described above, since a clock distributor circuit having a relatively simple configuration is employed to supply clock signals having mutually different phases. it is inhibited that all clock signals conduct the setting operation at the same time. This leads to an advantage that the transient current which influences the deviation of the power source potential and the increase in the radiation noise from the power source line can be suppressed without a large increase in the production cost of the circuit.

Furthermore, using the circuit producing a clock signal, there can be generated a clock signal having a longer pulse cycle. Consequently, according to the contents of function of the functional block, the number of setting operations can be reduced and hence the power consumption is minimized.

That is, in accordance with the present invention, the power consumption as well as the noise can be reduced without increasing the circuit size of the LSIC. Alternatively, it is possible to increase the size of LSIC while substantially keeping the power consumption and the noise level unchanged.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A large scale integrated circuit (LSIC), comprising:
    a plurality of functional blocks coupled with each other via an address bus, a data bus, and a plurality of control signals, at least one of the functional blocks being a control block for generating and outputting the control signals, the control block including means for conducting a data accessing operation to and from another one of the functional blocks via the address and data buses; and
    clock supply means for respectively supplying the functional blocks with a plurality of clock signals,
    wherein all of the plurality of clock signals ever conduct a setting operation at the same time.

2. An LSIC in accordance with claim 1, wherein the clock supply means includes a clock distributor circuit and at least one of the clock signals has a clock cycle different from those of the remaining clock signals.

3. An LSIC in accordance with claim 1, wherein the clock distributor circuit of the clock supply means includes three buffer circuits, two logical product circuits including a first logical product circuit and a second logical product circuit, and one flip-flop circuit,
    the flip-flop circuit including a clock input terminal linked with a clock input signal,
    the flip-flop circuit including a data output terminal connected to an input terminal of the first logical product circuit,
    the flip-flop circuit including an inverted data output terminal coupled with an input terminal of the second logical product circuit and a data input terminal of the flip-flop circuit,
    the first and second logical product circuits each including another input terminal connected to the clock input signal, and
    the clock input signal and output terminals of the first and second logical product circuits being coupled respectively to the buffer circuits to a predetermined functional block of the LSIC.

4. An LSIC in accordance with claim 1, wherein two of the clock signals have the same frequency.

5. An LSIC in accordance with claim 4, wherein the two clock signals that have the same frequency have different phases.

6. An LSIC in accordance with claim 1, wherein two of the clock signals have the same pulse width but different phases.

7. An LSIC in accordance with claim 1, wherein two of the clock signals have the same frequency and pulse width.

8. An LSIC in accordance with claim 7, wherein the two clock signals that have the same frequency and pulse width have different phases.

9. A method of lowering power consumption in a large scale integrated circuit (LSIC) comprising the steps of supplying a plurality of clock signals to functional blocks of the LSIC, at least one of which is a control block for conducting data accessing operation to and from another one of the functional blocks, wherein two of the plurality of clock signals have different frequencies and all of the plurality of clock signals never conduct a setting operation at the same time.

10. The method according to claim 9, wherein two of the plurality of clock signals have the same frequency.

11. The method according to claim 10, wherein the two clock signals that have the same frequency have different phases.

12. The method according to claim 9, wherein two of the plurality of clock signals have the same pulse width but different phases.

13. The method according to claim 9, wherein two of the plurality of clock signals have the same frequency and pulse width but different phases.

14. A large scale integrated circuit (LSIC), comprising:

a plurality of functional blocks coupled with each other via an address bus, a data bus, and a plurality of control signals, at least one of the functional blocks being a control block for generating and outputting the control signals, the control block including means for conducting a data accessing operation to and from another one of the functional blocks via the address and data buses; and clock supply means for respectively supplying the functional blocks with a plurality of clock signals, wherein the clock supply means includes a clock distributor circuit and at least one of the clock signals has a clock cycle different from those of the remaining clock signals, and the clock distributor circuit includes three buffer circuits, two logical product circuits including a first logical product circuit and a second logical product circuit, and one flip-flop circuit, the flip-flop circuit including a clock input terminal linked with a clock input signal, the flip-flop circuit including a data output terminal connected to an input terminal of the first logical product circuit, the flip-flop circuit including an inverted data output terminal coupled with an input terminal of the second logical product circuit and a data input terminal of the flip-flop circuit, the first and second logical product circuits each including another input terminal connected to the clock input signal, and the clock input signal and output terminals of the first and second logical product circuits being coupled respectively to the buffer circuits.

15. An LSIC according to claim 14, wherein all of said at least three clock output signals never conduct a setting operation at the same time.

16. An LSIC according to claim 14, wherein two of the clock output signals have the same frequency, but different phases.

17. An LSIC according to claim 14, wherein two of the clock output signals have the same pulse width but different phases.

18. An LSIC according to claim 14, wherein two of the clock output signals have the same frequency and pulse width, but different phases.

* * * * *